(12) United States Patent
Decombe

(10) Patent No.: US 6,879,332 B2
(45) Date of Patent: Apr. 12, 2005

(54) USER INTERFACE FOR DISPLAYING AND EXPLORING HIERARCHICAL INFORMATION

(75) Inventor: Jean Michel Decombe, Palo Alto, CA (US)

(73) Assignee: Groxis, Inc., San Francisco, CA (US)

( * ) Notice: Subject to any disclaimer, the term of this patent is extended or adjusted under 35 U.S.C. 154(b) by 329 days.

(21) Appl. No.: 09/859,343

(22) Filed: May 16, 2001

(65) Prior Publication Data

US 2002/0145623 A1 Oct. 10, 2002

Related U.S. Application Data

(60) Provisional application No. 60/204,915, filed on May 16, 2000.

(51) Int. Cl.$^7$ ............................................. G06F 13/00
(52) U.S. Cl. ....................................... 345/764; 345/848
(58) Field of Search ................................. 345/764, 781, 345/808, 810, 841, 848, 853, 760, 762, 763, 854, 835

(56) References Cited

U.S. PATENT DOCUMENTS

| | | | |
|---|---|---|---|
| 5,295,243 A | 3/1994 | Robertson et al. | |
| 5,341,466 A | 8/1994 | Perlin et al. | |
| 5,606,654 A | 2/1997 | Schuur | |
| 5,844,559 A | 12/1998 | Guha | |
| 5,845,270 A | 12/1998 | Schatz et al. | |
| 5,924,090 A | 7/1999 | Krellenstein | |
| 6,104,400 A | 8/2000 | Halachmi | |
| 6,111,578 A | 8/2000 | Tesler | |
| 6,237,006 B1 | 5/2001 | Weinberg | |
| 6,285,367 B1 | 9/2001 | Abrams | |
| 6,363,377 B1 | 3/2002 | Kravets et al. | |
| 6,373,484 B1 | 4/2002 | Orell et al. | |
| 6,377,287 B1 | 4/2002 | Hao et al. | |
| 6,434,556 B1 | 8/2002 | Levin et al. | |
| 6,460,025 B1 * | 10/2002 | Fohn et al. | 706/43 |
| 6,496,842 B1 * | 12/2002 | Lyness | 707/514 |
| 6,549,221 B1 * | 4/2003 | Brown et al. | 345/854 |
| 6,604,108 B1 | 8/2003 | Nitahara | |
| 6,628,304 B2 * | 9/2003 | Mitchell et al. | 345/734 |
| 2001/0034733 A1 | 10/2001 | Prompt et al. | |

OTHER PUBLICATIONS

Bederson et al, Pad++; A Zoomable Graphical Sketchpad For Exploring Alternate Interface Physics, Journal of Visual Languages and Computing, vol. 7, 1996, UK.

Bederson et al, Pad++; A Zoomable Graphical Sketchpad For Exploring Alternate Interface Physics, Symposium on User Interface Software and Technology, 1994, Marina del Rey, CA.

Hightower et al, Graphical Multiscale Web Histories: A Study of PadPrints, ACM Conference on Hypertext, Jun. 20, 998, Pittsburg, PA.

Bederson et al, Implementing a Zooming User Interface: Experience Building Pad++, Software: Practice and Experience, vol. 28, No. 10, Aug. 1998, West Sussex, England.

Perlin et al, Pad—An Alternative Approach to the Computer Interface, ACM SIGGRAPH, 1993, Anaheim, CA.

Bederson et al, A Zooming Web Browser, SPIE Multimedia Computing and Networking, vol. 2687, pp 260–271, 1996, San Jose, CA.

(Continued)

*Primary Examiner*—Cao (Kevin) Nguyen
(74) *Attorney, Agent, or Firm*—Strategic Patent Services, Inc.; Gary Zalewski

(57) ABSTRACT

A user interface is animated and configurable to optimize, facilitate and simplify displaying on a display device and exploring via user input a hierarchy of information accessible by an electronic device.

37 Claims, 3 Drawing Sheets

OTHER PUBLICATIONS

Bederson et al, A Zooming Web Browser, Human Factors in Web Development, Lawrence Erlbaum Assoc., pp 255–266, 1998, Mahwah, NJ.

Bederson et al, Space–Scale Diagrams: Understanding Multiscale Interfaces, ACM SIGCHI, 1995, Denver CO.

Bederson et al, Advances in the Pad++ Zoomable Graphics Widget Bederson, USENIX Tcl/Tkm'95 Workshop, 1995, Toronto, CA.

Bederon et al, Pad++ A Zoomable Graphical Interface, ACM SIGCHI '94, 1994, Boston, MA.

* cited by examiner

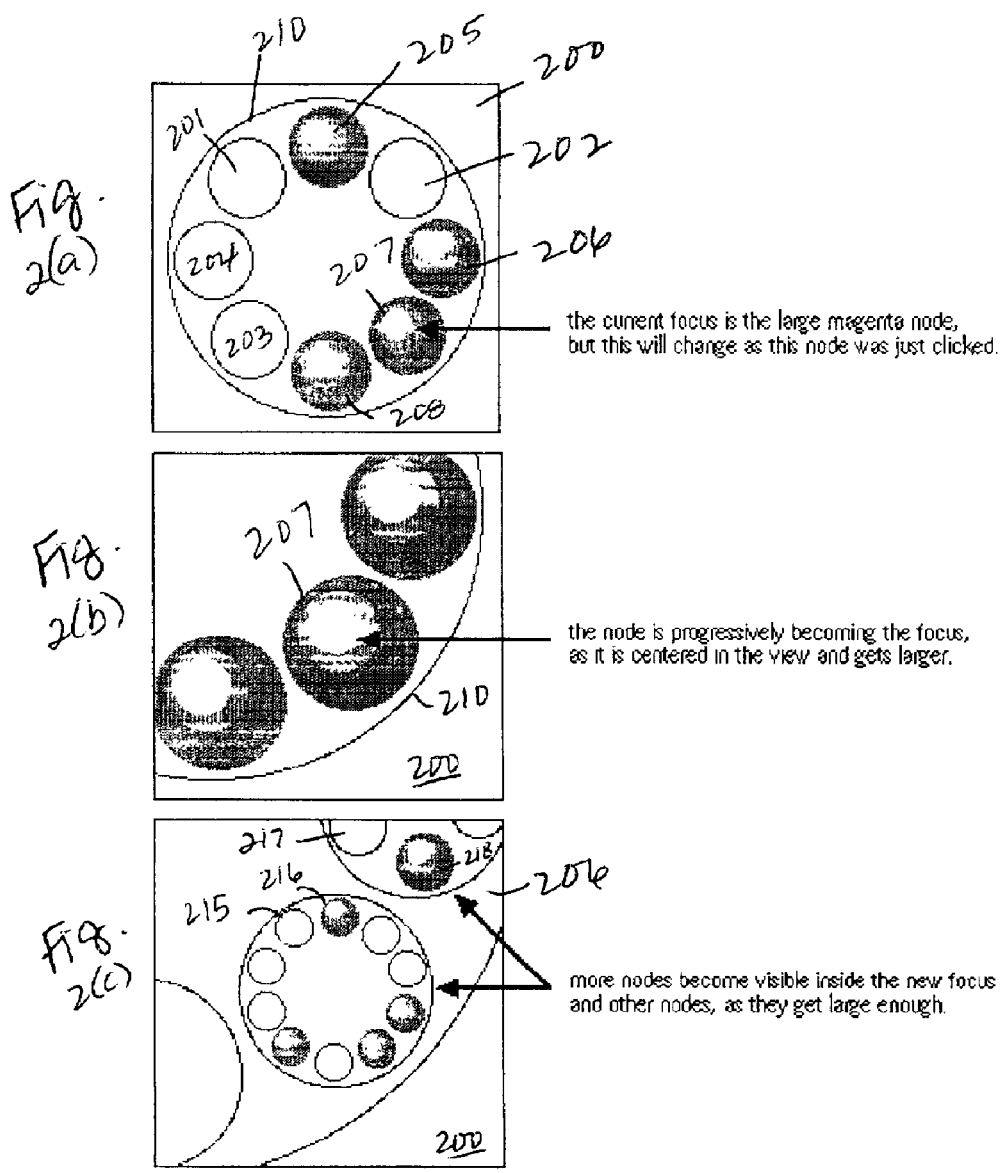

USER INTERFACE FOR DISPLAYING AND EXPLORING HIERARCHICAL INFORMATION

This application claims the benefit of provisional application No. 60/204,915, filed May 16, 2000.

FIELD OF THE INVENTION

The present invention relates to a user interface optimized to display and explore hierarchical information via a display device for an electronic device such as a computer, personal digital assistant, television, cellular telephone, etc.

BACKGROUND OF THE INVENTION

A user interface in accordance with the present invention is easier to use than prior art user interfaces designed to serve the same purpose, primarily due to click focusing and node aggregation mechanisms. Parameters can be adjusted to display only a few nodes, in order to facilitate exploration, or thousands of nodes simultaneously, in order to facilitate an individual's understanding of the entire hierarchy of information.

BRIEF DESCRIPTION OF THE DRAWINGS

The present invention is illustrated by way of example, and not necessarily by way of limitation in the figures of the accompanying drawings in which like reference numerals refer to similar elements.

FIGS. 2(a), 2(b) and 2(c) illustrate a partial transition from one focus to the next focus in accordance with one embodiment of the present invention.

DETAILED DESCRIPTION OF THE INVENTION

Figure 1:
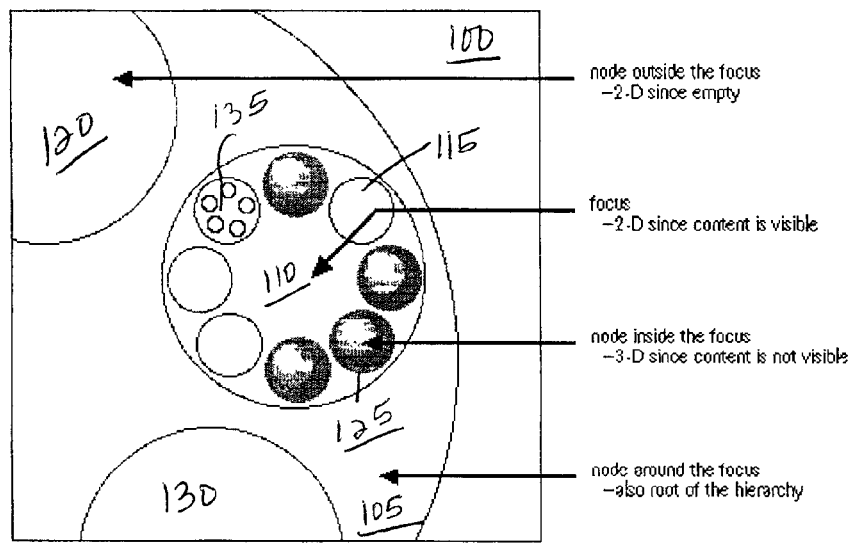
FIG. 1 illustrates various elements of a display in accordance with one embodiment of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data within a memory of an electronic device such as a computer. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical, optical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or other electronic device, that manipulates and transforms data represented as physical (electronic) quantities within the device's registers and memories into other data similarly represented as physical quantities within the memories or registers or other such information storage, transmission or display devices.

The invention also relates to apparatus for performing the operations herein. These apparatus may be specially constructed for the required purposes, or may comprise a general-purpose computing or electronic device selectively activated or reconfigured by a program stored in the device. Such a program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A user interface in accordance with the present invention can be used to explore any kind of hierarchy of information, for example, directories, query result sets (from databases engines, search engines, etc.), file stores, etc. Furthermore, the user interface contemplated by the present invention can be used on or in conjunction with any platform that has a pointing device (e.g., mouse, trackball, stylus, directional pad, remote control, etc.), including personal computers, Internet appliances, personal digital assistants, telephones, mobile or cellular telephones, television sets, etc. It is also contemplated that the user interface can be controlled through speech, eye movement, and other modalities.

With reference to FIG. 1, access to a hierarchy of information 100 is provided by way of nodes of information, or simply, nodes. The top node in the hierarchy of nodes is the root node 105 of the hierarchy. The root node 105 encompasses an inside, or subhierarchical, node that is the node of interest or focus for an individual viewing and accessing the hierarchy of information 100. Thus, the current node of interest being explored by a user in the hierarchy of information is called the focus node 110, or simply, focus 110. The focus 110 can and is expected to change as the user explores the hierarchy. Generally, the root node 105 initially is the focus 110.

The hierarchy of information 100 is displayed within a viewing region, or view, of a given size, known as the view size. Often times, the view size is, at least in part, a function of the viewable area of a display device, and may also be affected by the size of a window displayed on the display device in which window the hierarchy of information is displayed. The focus 110, in one embodiment, essentially is centered in the viewing region, and occupies a certain percentage of the view size, known as the focus-to-view size ratio, or more simply, focus-to-view ratio.

All other nodes displayed in the viewing region are displayed inside the focus, if the focus contains the nodes, e.g., nodes 115 and 125, outside the focus, if the nodes share a common, possibly recursive container with the focus, e.g., nodes 120 and 130, or around the focus (if the nodes contain the focus). In the example illustrated in FIG. 1, the root node 105 happens to be around the focus node 110.

To be displayed, nodes need to intersect with the viewing region and be larger than a certain size, known as the minimum node size. If a node that is displayed in the view contains other nodes that are too small to be displayed, that is, nodes of a size less than the minimum node size, the node is displayed in a shape that suggests to the viewer that the displayed node contains a subset of the hierarchical information that is currently hidden (this is referred to herein as a node aggregation mechanism). For example, a displayed node containing hidden hierarchical information may take the shape of a convex, three-dimensional node (e.g., spherical node 125, inside the focus node, is spherical or three-dimensional in shape, indicating further content, presently not visible, is inside the node).

In contrast, if a displayed node contains some nodes that are too small to be displayed and some other nodes that are all large enough to be displayed, the displayed node may have a different, three-dimensional appearance (e.g., a reversed conical shape, like an inverted funnel) to suggest to the viewer that more nodes will be revealed if either the view size, the focus-to-view ratio, or the minimum node size is adjusted appropriately. (It is appreciated that these parameters may be automatically, indirectly or manually adjusted).

If a node contains nodes that are all large enough to be displayed (that is, the nodes are of a size greater than the minimum node size), or if the node is empty, the node takes on yet another appearance. For example, node 115 appears empty, and has a flat, two-dimensional appearance, indicating the node is a leaf node, and no further subhierarchical information may be obtained via this node. Node 135 contains nodes large enough to be displayed, and is also flat, two-dimensional, indicating all nodes accessible via node 135 are large enough to be displayed.

Thus, in one embodiment of the invention, an aggregation mechanism is characterized by three cues (e.g., convexity, concavity, and flatness) that indicate three levels of sub-hierarchy visibility (none, partial, and total visibility).

It is appreciated that while the embodiment illustrated in FIG. 1 utilizes convex, concave, and flat nodes to depict or suggest the absence or presence of additional information in the hierarchy, other shapes, colors or symbols may be utilized to convey this information, so long as the viewer is able to discern between the different kinds of nodes. Moreover, while a node having a certain shape conveys to the viewer certain information, e.g., a convex shaped node may convey to the viewer whether further nodes that are too small to be displayed are accessible via the convex shaped node, other two- or three-dimensional characteristics may be interchanged to convey that same information without departing from the present invention.

In FIG. 1, nodes are disc-shaped and laid out in a circular fashion within a containing node. The user interface nonetheless works similarly with other, perhaps random, shapes and layouts. For example, the hierarchy illustrated in FIG. 1 could represent the map of a city, its buildings, their rooms, etc. Also, the user interface can be three-dimensional, in which case aggregate nodes are displayed as opaque, and all other nodes are displayed as translucent.

The user can select, for example, by clicking with a computer mouse, any visible node to make it the new focus node while preserving the spatial arrangement of nodes. In so doing, the focus is centered in response to the user selection. Thus, clicking on a node around the focus shrinks the visible space, clicking on a node outside the focus migrates, or translates, the visible space (also shrinking or enlarging the visible space as necessary), and clicking on a node inside the focus enlarges the visible space. If the selected node is already the focus, a special flag, known as the focus bouncing flag, decides whether nothing happens or whether the node that contains the focus, that is, the node around the focus node, becomes, in turn, the focus node.

This method is advantageous in that only a single action is required on the part of the user or viewer to change the focus—clicking on a node other than the focus node. In addition, focus bouncing eases exploring the hierarchically related nodes on smaller displays, such as a cellular telephone display screen.

In one embodiment of the invention, the visible space essentially is a flat surface that can be stretched around the center of the focus to display more or less detail regarding the focus. This surface is seen from above through the view, by default, but it can also be seen from a projected perspective, as if in three dimensions. In the case of the projected perspective, the view can be rotated by adjusting the direction of view relative to the focus, known as the view angle.

In accordance with the present invention, the size of the explored hierarchy of information is not a concern to the viewer or the implementor (that is, someone who implements the technology on a given platform using a given programming language) because rendering is contextual, i.e., the display is centered around the focus node. In stretching the visible space, there is no notion of absolute scale or position, because each node has a relative, polar position within its container node. First, the focus size is computed based on the focus-to-view ratio. Second, the smallest possible container that encloses the view is searched recursively starting from the focus. Third, this container is rendered, then its entire sub-hierarchy is rendered recursively, while branches of this sub-hierarchy where nodes do not intersect the view or are not large enough to be displayed are discarded. Thus, the amount of computation required to render the view is minimized, even at very deep levels of the displayed hierarchy, which depth can, in fact, be almost limitless. Moreover, rendering speed essentially is independent of the size of the displayed hierarchy.

It should be noted that a maximum leaf size, expressed in pixels, may be associated with any leaf node. In order to ensure that maximum leaf sizes are not exceeded unnecessarily, the focus node will sometimes not reach the size computed based on the focus-to-view ratio. Instead, the focus node might only reach a smaller (but never larger) size if all nodes in its sub-hierarchy have already reached their respective maximum leaf sizes. A default maximum leaf size is associated to all nodes that do not have a specific maximum leaf size.

FIG. 2 illustrates a partial, transition from one focus node to another focus node. Although the present invention contemplates animating the transition from one focus node to another, the FIG. 2 provides only three snap shots of the animated transition. Each of FIGS. 2(a), 2(b) and 2(c) illustrate a viewing region, or view, 200, upon a display screen. In FIG. 2(a), those nodes larger than the minimum node size are displayed. For example, root node 210, the focus node, is displayed and centered about viewing region 200. Further nodes 201–208 are displayed. Nodes 201 through 204 are flat, two-dimensional nodes, indicating, in one embodiment of the invention, that the nodes are empty, indicating such nodes are leaf nodes. Nodes 205–208, on the other hand, are convex, spherical shaped nodes, indicating such nodes contain yet further nodes containing a subset of hierarchical information.

The transition from one focus node to the next, i.e., from a source node to a destination node, is animated, in one embodiment of the invention, to avoid disorienting the user, through a given number of animation frames, known as the animation frame count. The transition may be linear to avoid inducing in the user any feeling of motion sickness during lengthy exploration sessions. The speed of the transition, known as the animation speed factor, is constant by default but can be adjusted so as to speed up or slow down the transition. For example, a user may select node 207 in FIG. 2(a), by clicking on the node using an input device such as a mouse. The node 207 begins to expand and migrate toward the center of the viewing region. FIG. 2(b) shows an intermediate step in the animated migration and expansion of node 207. Note that node 207 is progressively becoming the focus, as it is centered in the view and gets larger.

(The term "source node", as used herein, refers to the source focus node, that is, the present focus node, or simply, focus node. The term "destination node" as used herein, refers to the destination focus node, that is, the node that the user has selected and that is to become the focus, once the transition from the present focus to the selected node is completed).

Eventually, node 207 is centered and the visible space provided for the node increased, as shown in FIG. 2(c), relative to the size of the node as originally viewed in FIG. 2(a). The node size of node 207 increased in the transition, and the nodes contained within node 207, e.g., nodes 215 and 216, are now larger than the minimum node size and are, thus, displayed as well. Optionally, nodes contained in nodes other than the focus node, and that are larger than the minimum node size, are also displayed. For example, nodes 217 and 218 are visible in node 206.

It should be noted that when the distance between the source node and destination node is so large that the animation would not fill its cognitive role (because no two successive animation frames ever intersect), the transition may become, in one embodiment of the present invention, a combination of translating and morphing to suggest or infer the direction and length of the vector from destination node's position to the source node's position (i.e., the center of the view).

In this manner, the destination node's position and size are first computed relative to the focus node. Then, a vector from the destination node's position to the source node's position is computed. If the vector is too long, that is, if the vector divided by the animation frame count still exceeds the size of the view, a morphing animation is used to symbolize the long translation. Otherwise, the vector is broken down into a discrete amount of steps. Then, the destination node's position and size is progressively adjusted to reach those of the focus node.

To reiterate, the vector is too long if, after having divided it by the number of transition frames, also known as the animation frame count, the resulting, smaller vector still exceeds the dimensions of the view. In other words, if one were to draw each animation frame thusly obtained next to one another, one would notice that no two successive frames have any pixel in common, because they do not intersect—if the frames were displayed in succession to animate the transition, the user would not detect motion. The user would merely see the screen display jumping from one frame to a totally different next frame, and so on.

Adjusting the user interface parameters referred to above is optional, and not necessary for proper operation of the present invention. The controls may be desirable on a personal computer, while they may unnecessarily clutter the display on a personal digital assistant, or make the user interface harder to use on a television set. In these cases, default values may be preset.

Figure 3A:
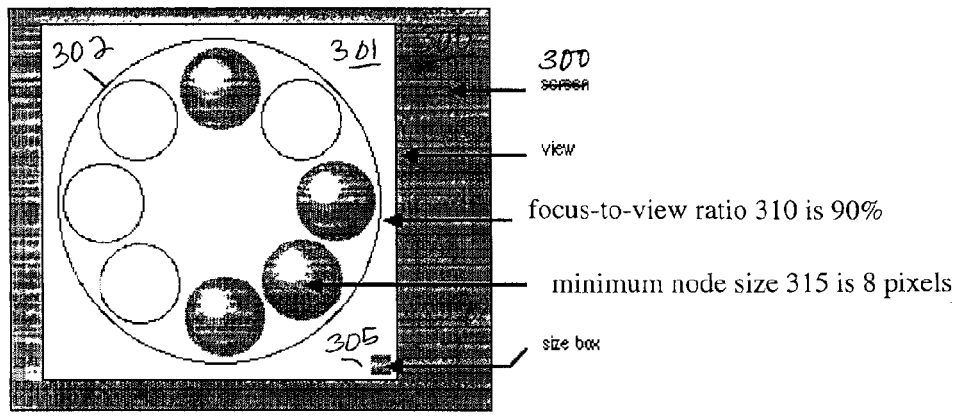
FIGS. 3(a) and 3(b) illustrate an adjustment of user interface parameters through controls, in accordance with one embodiment of the present invention.
Figure 3B:
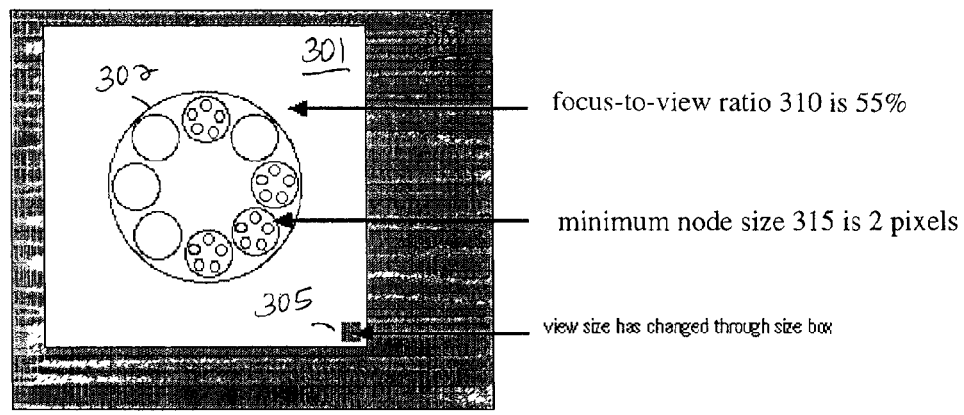

With reference to FIG. 3, various such parameters are now discussed. A display screen 300 is shown. Within display screen 300 is a viewing region, or view, 301. The viewing region in FIG. 3(a) provides for a larger viewing area, while the view in FIG. 3(b) is relatively smaller. The view size may be expressed, for example, as a pair of pixel values, and can be adjusted using, for example, a size box. A focus node 302 is displayed in the viewing region. The focus-to-view ratio 310 may be expressed as a percentage, and can be adjusted, for example, using a linear slider (not shown). The slider may be displayed by selecting to adjust this parameter via a pull down menu, or may be incorporated in the display screen, for example, adjacent the viewing region. In FIG. 3(a), the focus-to-view ratio is 90%, whereas in FIG. 3(b), the focus-to-view ratio is 55%.

The minimum node size 315 may be expressed as a pixel value, and can also be adjusted, for example, using a linear slider (not shown). For example, FIGS. 3(a) and 3(b) illustrate minimum node sizes of 8 pixels and 2 pixels respectively. Thus, further granularity in the display is provided in FIG. 3(b) versus FIG. 3(a). That is, additional levels of nodes within the hierarchy of information accessed via focus node 302 are displayed in FIG. 3(b) versus FIG. 3(a).

The focus bouncing flag (not shown), discussed above, is expressed as a Boolean value and can be adjusted, for example, using a check box. The view angle, referred to earlier, may be expressed as an angle and can be adjusted, for example, using a circular slider (not shown). The default maximum leaf size may be expressed as a pixel value and can be adjusted, for example, using a linear slider (not shown). The animation frame count may be expressed as an integer and can be, for example, automatically configured based on system memory, processor speed, etc. The animation speed factor may be expressed as a real number and can be adjusted, for example, using a linear slider (not shown).

What is claimed is:

1. A user interface system comprising:
a plurality of nodes organized into a hierarchy of information wherein at least one node is a source focus and nodes contained inside the focus forming a sub-hierarchy,
said focus being substantially centered in a view,
an aggregator mechanism for associating at least one visual cue to a node in the view and where the visual cue suggests the contents of said at least one node to a user interacting with the system,
a means for rendering nodes in the view.

2. The user interface of claim 1, wherein the aggregation mechanism associates a cue with a node to indicate that the node contains sub-hierarchy that is completely hidden.

3. The user interface of claim 2, wherein the cue is convex shape.

4. The user interface of claim 2, wherein the node having an associate cue contains other nodes all of which are too small to be displayed.

5. The user interface of claim 1, wherein the aggregation mechanism associates a cue with the node indicates that the node contains partial hidden sub-hierarchy.

6. The user interface of claim 5, wherein the cue is concave shape.

7. The user interface of claim 5, wherein the node in the view associated with a cue contains other nodes some of which are too small to be displayed.

8. The user interface of claim 1, wherein the aggregation mechanism associates a cue with the node to indicate that the node contains no hidden sub-hierarchy.

9. The user interface of claim 8, wherein the cue has a flat shape.

10. The user interface of claim 8, wherein the cue indicates that all nodes contained in the node having the cue are visible and displayed.

11. The user interface of claim 8, wherein the node having a cue to indicate the node contains no hidden sub-hierarchy is also empty and a leaf node.

12. The user interface of claim 1, wherein the aggregation mechanism associates a color or symbol to establish visual cues.

13. The user interface of claim 1, wherein node shape, color or symbol may depict or suggest the absence or presence of additional information in the hierarchy.

14. The user interface of claim 1, wherein the system includes an adjustable view angle.

15. The user interface of claim 1, wherein the system further including at least one adjustable parameter to facilitate exploration wherein the adjustable parameter may change the number of nodes displayed or the visual cues applied by the aggregator mechanism.

16. The user interface of claim 15, wherein a user may adjust the adjustable parameter to display only a few or many nodes in order to simplify exploration or facilitate an individual's understanding of the entire hierarchy of information, respectively.

17. The user interface of claim 15, wherein the adjustable parameter is selected from the group consisting of view size, minimum node size, focus-to-view ratio and default maximum leaf size.

18. The user interface of claim 17, wherein focus-to-view ratio is the selected adjustment and is provided via a slider incorporated on a display screen.

19. The user interface of claim 15, wherein changes to the selected parameter may result in a change of a node's visual cue.

20. The user interface of claim 19, wherein a change in the selected adjustable parameter results in at least one node having a cue change and where the cue changes to a shape selected from the group consisting of convex, concave and flat.

21. A user interface system comprising:
a plurality of nodes organized into a hierarchy of information wherein at least one node is a source focus and nodes contained inside the focus forming a sub-hierarchy,
said focus being substantially centered in a view,
an aggregator means for associating at least one visual cue to a node in the view and where the visual cue suggests the contents of said at least one node to a user interacting with the system,
a means for rendering nodes in the view according to their associated visual cue,
wherein the system may allow a user to change focus to a destination node in the hierarchy.

22. The user interface of claim 21, wherein the user selects the destination node with a pointing device.

23. The user interface of claim 22, wherein the pointing device enables a user to click on a node around the focus and where the system responds by shrinking the visible space.

24. The user interface of claim 22, wherein the pointing device enables a user to click on a node outside the focus and where the system responds migrating or translating the visible space.

25. The user interface of claim 22, wherein the pointing device enables a user to click on a node inside the focus and where the system responds by enlarging the visible space associated with the node.

26. The user interface of claim 22, wherein a transition is shown in the view to animate the change of source focus to destination focus selected by the user.

27. The user interface of claim 22, wherein the destination node selected by the user is substantially centered in the view at the termination of the animation.

28. The user interface of claim 27, wherein the user interface also having an adjustment for animation speed factor.

29. The user interface of claim 27, wherein the animation is a linear straight-line transition.

30. The user interface of claim 27, wherein the animation is non-linear transition having a non-linear speed.

31. The user interface of claim 27, wherein the animation is combination of translating and morphing.

32. The user interface of claim 31, wherein the animation may suggest or infer the direction and length of the vector from the newly selected destination node position to the source focus position in the center of the view.

33. The user interface of claim 27, wherein the user interface further including an animation frame count that sets number of frames to use in the animation.

34. The user interface of claim 33, wherein the animation frame count is automatically configured based on system memory, processor speed, etc.

35. The user interface of claim 33, wherein the destination node's position and size are computed relative to the focus node and a vector from the destination node's position to the source node's position is computed and divided by the animation frame count to determine if it exceeds the size of the view.

36. The user interface of claim 35, wherein the divided value is greater than the size of the view and a morphing animation is used to symbolize the long transition.

37. The user interface of claim 35, wherein the divided value is less than the size of the view and the vector is broken down into a discrete amount of steps of which the destination node's position and size is progressively adjusted to reach those of the focus node.

* * * * *